United States Patent
Iwata et al.

(10) Patent No.: US 12,270,327 B2
(45) Date of Patent: Apr. 8, 2025

(54) EXHAUST GAS PURIFICATION CATALYST APPARATUS

(71) Applicants: CATALER CORPORATION, Kakegawa (JP); TOYOTA JIDOSHA KABUSHIKI KAISHA, Toyota (JP)

(72) Inventors: Kana Iwata, Kakegawa (JP); Minoru Itou, Kakegawa (JP); Takeru Yoshida, Toyota (JP); Masaru Kakinohana, Toyota (JP); Hiromasa Suzuki, Toyota (JP); Atsushi Tanaka, Toyota (JP)

(73) Assignees: CATALER CORPORATION, Kakegawa (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 673 days.

(21) Appl. No.: 17/620,806

(22) PCT Filed: Jun. 17, 2020

(86) PCT No.: PCT/JP2020/023843
§ 371 (c)(1),
(2) Date: Dec. 20, 2021

(87) PCT Pub. No.: WO2020/262173
PCT Pub. Date: Dec. 30, 2020

(65) Prior Publication Data
US 2022/0412244 A1      Dec. 29, 2022

(30) Foreign Application Priority Data

Jun. 26, 2019      (JP) ................................ 2019-118961

(51) Int. Cl.
*F01N 3/28*      (2006.01)
*B01J 21/04*      (2006.01)
(Continued)

(52) U.S. Cl.
CPC ............ *F01N 3/2828* (2013.01); *B01J 21/04* (2013.01); *B01J 23/63* (2013.01); *B01J 35/56* (2024.01);
(Continued)

(58) Field of Classification Search
None
See application file for complete search history.

(56) References Cited

U.S. PATENT DOCUMENTS

2006/0263574 A1    11/2006    Tsunekawa et al.
2016/0038927 A1    2/2016    Kadota et al.
(Continued)

FOREIGN PATENT DOCUMENTS

JP    2009-255029 A    11/2009
JP    2015-085241 A    5/2015
(Continued)

OTHER PUBLICATIONS

Aug. 11, 2020 International Search Report issued in International Patent Application No. PCT/JP2020/023843.
(Continued)

*Primary Examiner* — Jelitza M Perez
(74) *Attorney, Agent, or Firm* — Oliff PLC

(57) ABSTRACT

An exhaust gas purification catalyst apparatus has a honeycomb base material and a catalyst noble metal supported by the honeycomb base material, wherein: the honeycomb base material contains ceria-zirconia composite oxide particles as one of the constituent materials, is of a wall flow type, and includes inlet-side cells and outlet-side cells demarcated by porous partition walls; the catalyst noble metal is supported in inlet-side support regions and outlet-side support regions; each of the inlet-side support regions is formed with a specific length from the exhaust gas flow upstream end; the catalyst noble metal 70% support depth is not greater than
(Continued)

50% of the thickness of the porous partition walls; each of the outlet-side support regions is formed with a specific length from the exhaust gas flow downstream end; and the catalyst noble metal 70% support depth is greater than 50% of the thickness of the porous partition walls.

8 Claims, 6 Drawing Sheets

(51) Int. Cl.
*B01J 23/63* (2006.01)
*B01J 35/56* (2024.01)

(52) U.S. Cl.
CPC ...... *F01N 2330/06* (2013.01); *F01N 2330/30* (2013.01); *F01N 2370/02* (2013.01)

(56) References Cited

U.S. PATENT DOCUMENTS

| | | | |
|---|---|---|---|
| 2017/0306823 A1* | 10/2017 | Onoe | B01D 53/945 |
| 2018/0001308 A1 | 1/2018 | Ohashi et al. | |
| 2018/0229183 A1 | 8/2018 | Kadota et al. | |
| 2019/0091628 A1 | 3/2019 | Takayama et al. | |
| 2019/0143313 A1 | 5/2019 | Goto et al. | |
| 2019/0144342 A1 | 5/2019 | Goto et al. | |
| 2019/0193057 A1 | 6/2019 | Hoshino et al. | |
| 2020/0222881 A1 | 7/2020 | Goto et al. | |
| 2020/0222883 A1 | 7/2020 | Goto et al. | |
| 2020/0222889 A1 | 7/2020 | Goto et al. | |
| 2020/0222890 A1 | 7/2020 | Goto et al. | |
| 2020/0232367 A1 | 7/2020 | Yamamoto et al. | |
| 2020/0232368 A1 | 7/2020 | Yamamoto et al. | |
| 2020/0256235 A1 | 8/2020 | Kadota et al. | |
| 2020/0276568 A1 | 9/2020 | Makino et al. | |
| 2020/0340383 A1 | 10/2020 | Tojo et al. | |

FOREIGN PATENT DOCUMENTS

| | | | |
|---|---|---|---|
| JP | 2016-036781 A | | 3/2016 |
| JP | 2016-077980 A | | 5/2016 |
| JP | 2016-196824 A | | 11/2016 |
| JP | 2017-006827 A | | 1/2017 |
| JP | 2017-039069 A | | 2/2017 |
| JP | 2017-115786 A | | 6/2017 |
| JP | 2018-051442 A | | 4/2018 |
| JP | 2018-122270 A | | 8/2018 |
| JP | 2018-171560 A | | 11/2018 |
| JP | 2019-058870 A | | 4/2019 |
| JP | 2019-058872 A | | 4/2019 |
| JP | 2019-058873 A | | 4/2019 |
| JP | 2019-058874 A | | 4/2019 |
| JP | 2019-058876 A | | 4/2019 |
| JP | 2019-084482 A | | 6/2019 |
| JP | 2020-082070 A | | 6/2020 |
| JP | 2020-114786 A | | 7/2020 |
| JP | 2020-115001 A | | 7/2020 |
| JP | 2020-179348 A | | 11/2020 |
| WO | 2006/040874 A1 | | 4/2006 |
| WO | 2018/012564 A1 | | 1/2018 |
| WO | 2018/012565 A1 | | 1/2018 |
| WO | 2018/012566 A1 | | 1/2018 |
| WO | WO-2018056246 A1 * | 3/2018 | ........... B01D 53/945 |
| WO | 2019/078096 A1 | | 4/2019 |

OTHER PUBLICATIONS

Aug. 11, 2020 Written Opinion of the International Searching Authority issued in International Patent Application No. PCT/JP2020/023843.

Dec. 28, 2021 International Preliminary Report on Patentability issued in International Patent Application No. PCT/JP2020/023843.

* cited by examiner

EXHAUST GAS PURIFICATION CATALYST APPARATUS

FIELD

The present invention relates to an exhaust gas purification catalyst apparatus.

BACKGROUND

Exhaust gases emitted from internal combustion engines such as automobile engines contain hydrocarbons (HC), carbon monoxide (CO), and nitrogen oxides (NOx). In order to purify these, an exhaust gas purification catalyst apparatus is installed in such internal combustion engines.

Exhaust gas purification catalyst apparatuses may have a structure including a honeycomb-structure substrate and a catalyst coating layer. The honeycomb-structure substrate may have a plurality of cells partitioned by a partition wall, and the catalyst coating layer may be formed on the partition wall in the cells or on the partition wall. The catalyst coating layer may contain a catalyst noble metal, such as platinum, palladium, or rhodium, and metal oxide particles, and the catalyst noble metal may be supported on a part or the all of the metal oxide particles. The catalyst coating layer may contain auxiliary catalyst particles such as composite oxide particles (OSC material) containing ceria having an oxygen storage capacity.

As a substrate used in exhaust gas purification catalyst apparatuses, wall-flow substrates are known. In wall-flow substrates, the plurality of cells partitioned by the porous partition wall include inlet side cells, each of which has an exhaust gas flow upstream side which is open and a downstream side which is sealed, and outlet side cells, each of which has an exhaust gas flow upstream side which is sealed and a downstream side which is open, and are thereby configured to exhaust gas flowing into the inlet side cells passes through the porous partition wall and is discharged from the outlet side cells.

As examples of exhaust gas purification catalyst apparatuses in which a wall-flow substrate is used, for example, the apparatuses described in Patent Literature 1 and 2 are known.

Patent Literature 1 describes a high-load operation catalyst, comprising an entry side catalyst layer formed with a predetermined length from the vicinity of an exhaust gas flow upstream end in a partition wall of inlet side cells of a wall-flow substrate, and an exit side catalyst layer formed with a predetermined length from the vicinity of the exhaust gas flow downstream end in the partition wall of outlet side cells, wherein there is more catalyst noble metal in the exit side catalyst layer than the catalyst noble metal of the entry side catalyst layer. Patent Literature 1 further describes in the Examples that the catalyst layer of the high-load operation catalyst contains palladium and rhodium as catalyst noble metals, alumina as a carrier, and a ceria-zirconia composite oxide as an OSC material.

Patent Literature 2 describes a wall-flow substrate, wherein a ceria-zirconia solid solution is contained in constituent components of a porous partition wall partitioning the plurality of cells. Patent Literature 2 further describes that a catalyst noble metal selected from platinum, palladium, and rhodium may be supported on the porous partition wall of the substrate.

CITATION LIST

Patent Literature

[PTL 1] Japanese Unexamined Patent Publication (Kokai) No. 2018-122270
[PTL 2] Japanese Unexamined Patent Publication (Kokai) No. 2017-115786

SUMMARY

Technical Problem

The present invention aims to provide an exhaust gas purification catalyst apparatus using a wall-flow substrate, in which utilization efficiency of the catalyst noble metal is improved.

Solution to Problem

The present invention is as follows.
<<Aspect 1>> An exhaust gas purification catalyst apparatus comprising a honeycomb substrate and one or more catalyst noble metals supported by the honeycomb substrate, wherein
the honeycomb substrate has a plurality of cells partitioned by a porous partition wall,
the porous partition wall contains ceria-zirconia composite oxide particles as a constituent material,
the plurality of cells comprise:
an inlet side cell which is open on an upstream side of an exhaust gas flow and sealed on a downstream side thereof, and
an outlet side cell which is sealed on the upstream side of the exhaust gas flow and open on the downstream side thereof, and
are thereby configured to allow an exhaust gas flowed into the inlet side cell to pass through the porous partition wall and discharge from the outlet side cell,
the catalyst noble metal is supported in an inlet side support region and an outlet side support region of the porous partition wall,
the inlet side support region:
is present in a length of 60% or more and 100% or less of a total length of the honeycomb substrate from an exhaust gas flow upstream end of the inlet side cell, and
when an amount of the catalyst noble metal supported in the inlet side support region is accumulated in a depth direction from an inlet side surface of the porous partition wall, a depth up to which 70% of the catalyst noble metal supported in the inlet side support region is supported is 50% or less of the thickness of the porous partition wall, and
the outlet side support region:
is present in a length of 5% or more and 50% or less of the total length of the honeycomb substrate from an exhaust gas flow downstream end of the outlet side cell, and
when an amount of the catalyst noble metal supported in the outlet side support region is accumulated in the depth direction from an outlet side surface of the porous partition wall, a depth up to which 70% of the catalyst noble metal supported in the outlet side support region is supported is more than 50% of the thickness of the porous partition wall.
<<Aspect 2>> The exhaust gas purification catalyst apparatus according to Aspect 1, wherein the length of the total of the inlet side support region and the outlet side support region is more than 100% of the total length of the honeycomb substrate.

<<Aspect 3>> The exhaust gas purification catalyst apparatus according to Aspect 1 or 2, wherein the length of the inlet side support region is 70% or more and 100% or less of the total length of the honeycomb substrate.

<<Aspect 4>> The exhaust gas purification catalyst apparatus according to any one of Aspects 1 to 3, wherein the length of the outlet side support region is 10% or more and 45% or less of the total length of the honeycomb substrate.

<<Aspect 5>> The exhaust gas purification catalyst apparatus according to any one of Aspects 1 to 4, wherein when the amount of the catalyst noble metal supported in the inlet side support region is accumulated in the depth direction from the inlet side surface of the porous partition wall, the depth up to which 70% of the catalyst noble metal supported in the inlet side support region is supported is 30% or less of the thickness of the porous partition wall.

<<Aspect 6>> The exhaust gas purification catalyst apparatus according to any one of Aspects 1 to 5, wherein when the amount of the catalyst noble metal supported in the outlet side support region is accumulated in the depth direction from the outlet side surface of the porous partition wall, the depth up to which 70% of the catalyst noble metal supported in the outlet side support region is supported is 60% or more of the thickness of the porous partition wall.

<<Aspect 7>> The exhaust gas purification catalyst apparatus according to any one of Aspects 1 to 6, wherein the catalyst noble metal is one or more selected from platinum, palladium, and rhodium.

<<Aspect 8>> The exhaust gas purification catalyst apparatus according to any one of Aspects 1 to 7, wherein the porous partition wall does not have a catalyst coating layer.

Advantageous Effects of Invention

In the exhaust gas purification catalyst apparatus of the present invention, the catalyst noble metal is supported in a suitable arrangement with respect to the exhaust gas flow when exhaust gas flowing from the inlet side cells of the wall-flow substrate passes through the porous partition wall and is discharged from the outlet side cells. Thus, the exhaust gas purification catalyst apparatus of the present invention has extremely high catalyst noble metal utilization efficiency, which enables efficient exhaust gas purification.

DESCRIPTION OF EMBODIMENTS

<<Exhaust Gas Purification Catalyst Apparatus>>

Figure 1:
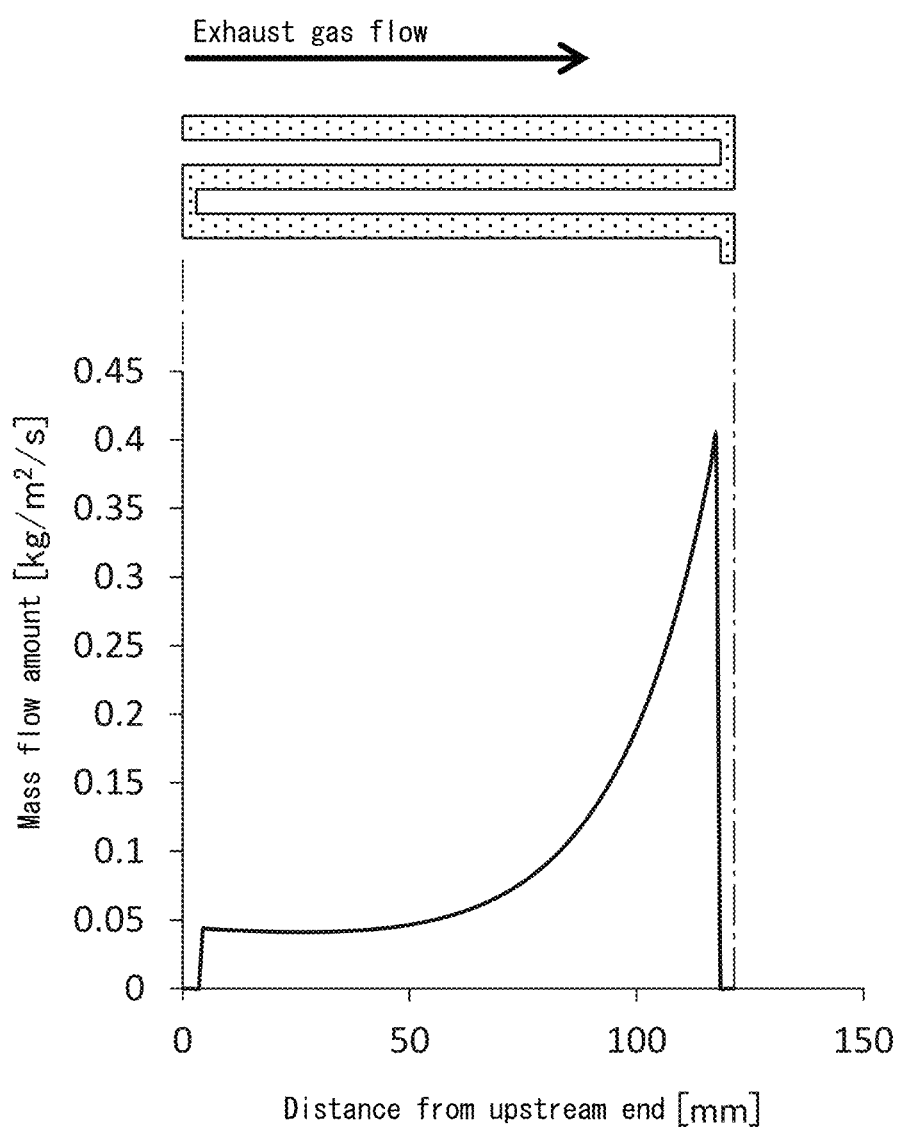
FIG. 1 is a graph showing simulation results of the relationship between distance from an exhaust gas flow upstream end and gas amount passing through the porous partition wall when exhaust gas flows into a wall-flow substrate.

The exhaust gas purification catalyst apparatus of the present invention comprises a honeycomb substrate and one or more catalyst noble metals supported by the honeycomb substrate, wherein the honeycomb substrate has a plurality of cells partitioned by a porous partition wall, the porous partition wall contains ceria-zirconia composite oxide particles as a constituent material, the plurality of cells comprise:
   an inlet side cell which is open on an upstream side of an exhaust gas flow and sealed on a downstream side thereof, and
   an outlet side cell which is sealed on the upstream side of the exhaust gas flow and open on the downstream side thereof, and
   are thereby configured to allow an exhaust gas flowed into the inlet side cell to pass through the porous partition wall and discharge from the outlet side cell, the catalyst noble metal is supported in an inlet side support region and an outlet side support region of the porous partition wall, the inlet side support region:
   is present in a length of 60% or more and 100% or less of a total length of the honeycomb substrate from an exhaust gas flow upstream end of the inlet side cell, and
   when an amount of the catalyst noble metal supported in the inlet side support region is accumulated in a depth direction from an inlet side surface of the porous partition wall, a depth up to which 70% of the catalyst noble metal supported in the inlet side support region is supported is 50% or less of the thickness of the porous partition wall, and the outlet side support region:
   is present in a length of 5% or more and 50% or less of the total length of the honeycomb substrate from an exhaust gas flow downstream end of the outlet side cell, and
   when an amount of the catalyst noble metal supported in the outlet side support region is accumulated in the depth direction from an outlet side surface of the porous partition wall, a depth up to which 70% of the catalyst noble metal supported in the outlet side support region is supported is more than 50% of the thickness of the porous partition wall.

In the exhaust gas purification catalyst apparatus of the present invention, a wall-flow substrate comprising ceria-zirconia composite oxide particles as a constituent material is used. Further, in this wall-flow substrate, the catalyst noble metal is locally supported in the inlet side cells near the upstream side surface, and the catalyst noble metal is distributed and supported in the outlet side cells in a wide range from the downstream side surface to a deep location. In the exhaust gas purification catalyst apparatus of the present invention, due to such a configuration, when exhaust gas flowing into the inlet side cells of the wall-flow substrate passes through the porous partition wall and is discharged from the outlet side cells, the exhaust gas can efficiently contact the appropriately-arranged catalyst noble metal, which enables efficient purification of the exhaust gas.

FIGS. 1 to 4 show simulation results of exhaust gas flow when exhaust gas is flowed into a wall-flow substrate. In these drawings, the following wall-flow substrate and exhaust gas flow rate are assumed, and the exhaust gas flow is simulated using commercially available simulation software.

<Wall-Flow Substrate>
  Length: 122 mm
  Diameter: 117 mm
  Capacity: 1,312 cm$^3$
  Number of cells: 47 cells/cm$^2$
  Porous wall thickness: 0.25 mm
  Porosity of porous wall: 56 to 67%
  Average pore diameter: 20 μm
<Exhaust Gas Flow Rate>
  Intake air mass flow rate Ga: 140 g/sec
<Simulation Software>
  Product name: "Axisuite" produced by Exothermia S.A.

Figure 2:
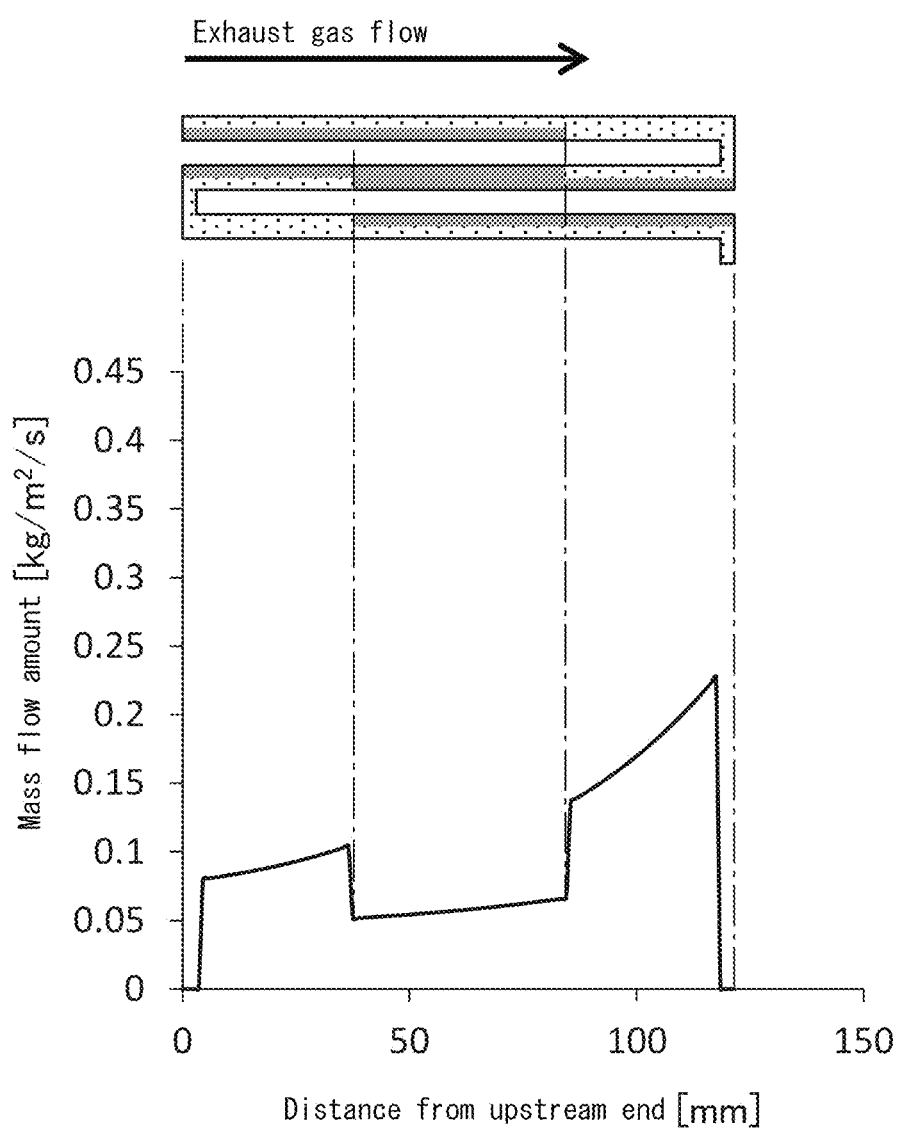
FIG. 2 is a graph showing simulation results of the relationship between distance from an exhaust gas flow upstream end and gas amount passing through the porous partition wall when exhaust gas flows into a wall-flow substrate comprising an inlet side coating layer having a length of 70% of the total length of the substrate from an exhaust gas flow upstream end in inlet side cells, and an outlet side coating layer having a length of 70% of the total length of the substrate from an exhaust gas flow downstream end in outlet side cells.
Figure 3:
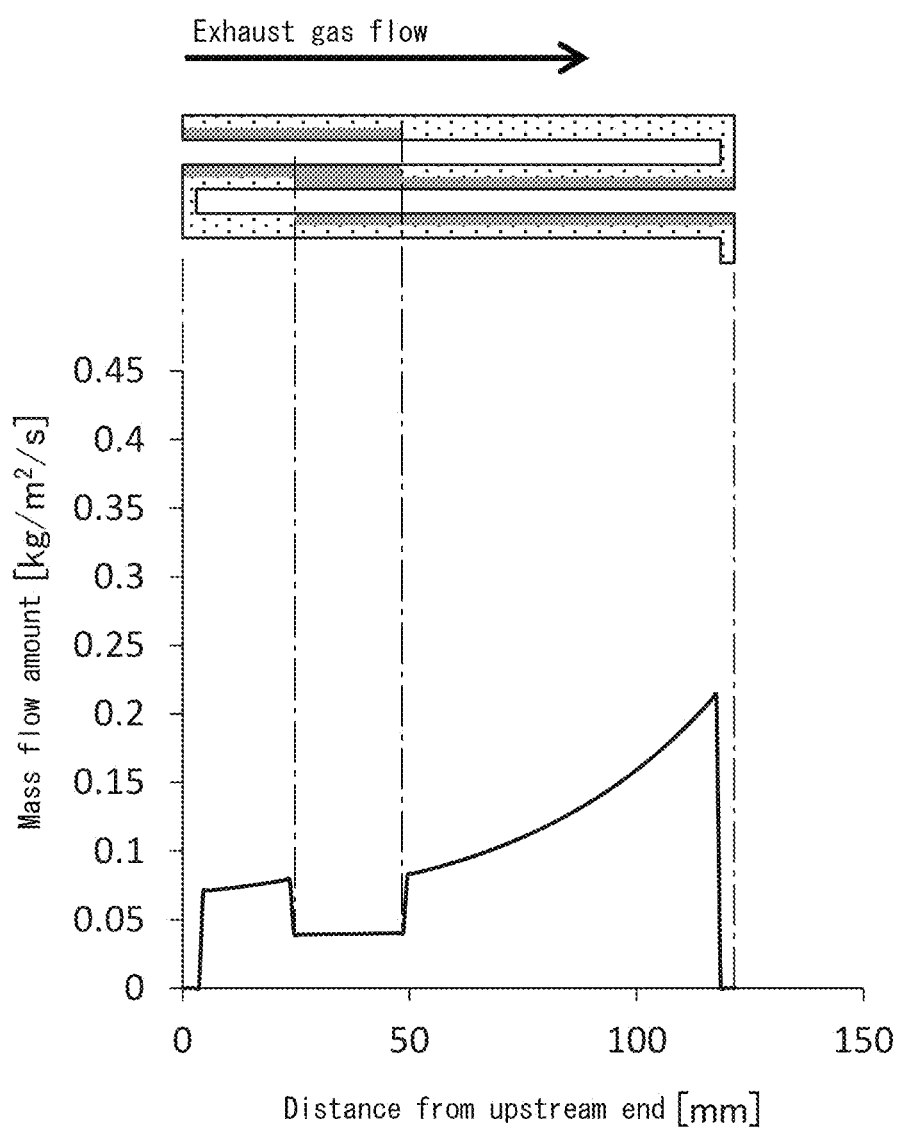
FIG. 3 is a graph showing simulation results of the relationship between distance from an exhaust gas flow upstream end and gas amount passing through the porous partition wall when exhaust gas inflows into a wall-flow substrate comprising an inlet side coating layer having a length of 40% of the total length of the substrate from an exhaust gas flow upstream end in inlet side cells, and an outlet side coating layer having a length of 80% of the total length of the substrate from an exhaust gas flow downstream end in outlet side cells.
Figure 4:
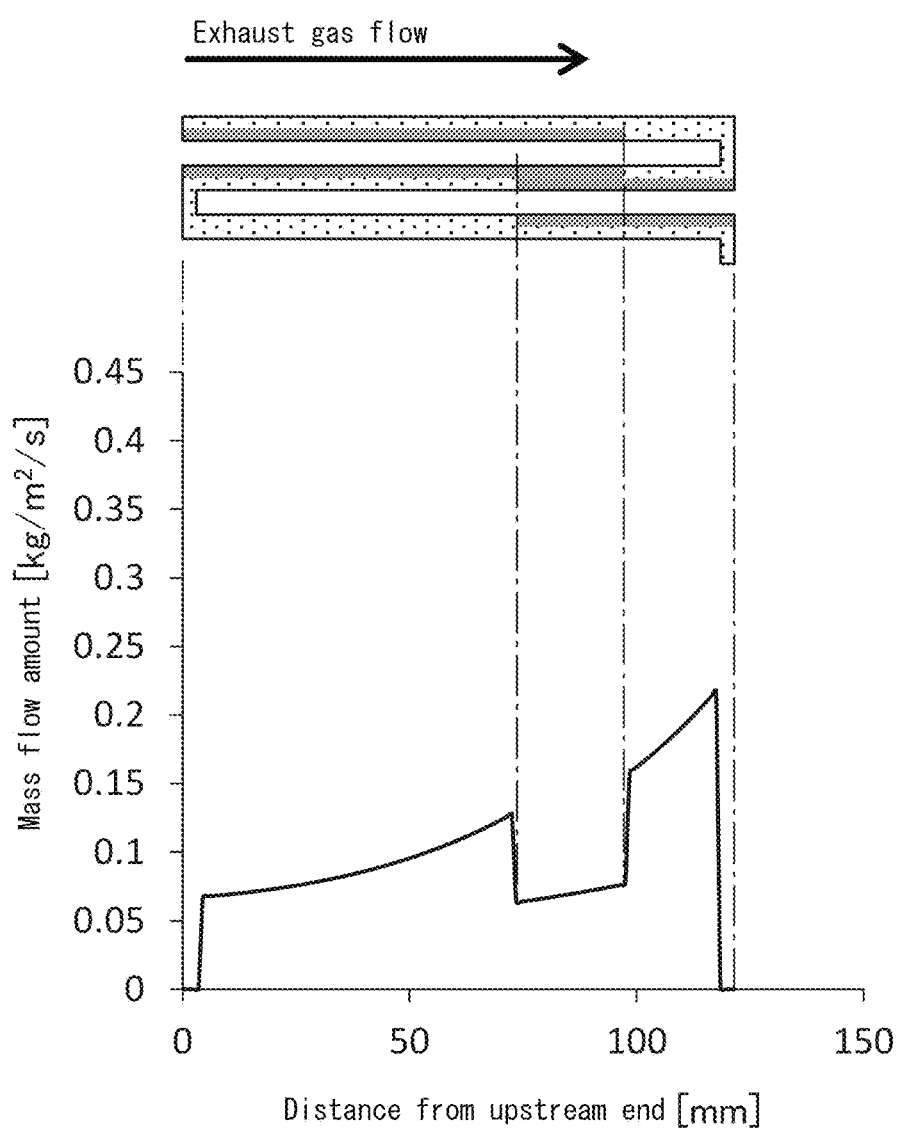
FIG. 4 is a graph showing simulation results of the relationship between distance from an exhaust gas flow upstream end and gas amount passing through the porous partition wall when exhaust gas inflows into a wall-flow substrate comprising an inlet side coating layer having a length of 80% of the total length of the substrate from an exhaust gas flow upstream end in inlet side cells, and an outlet side coating layer having a length of 40% of the total length of the substrate from an exhaust gas flow downstream end in outlet side cells.

The horizontal axes of the graphs represent the distance from the upstream end of the substrate, and the vertical axes represent the amount of exhaust gas passing through the porous wall at a specific distance from the upstream end, per unit area of the porous wall and unit time. FIG. 1 also shows an overlaid image of the wall-flow substrate. FIGS. 2 to 4 also show overlaid images of exhaust gas purification catalyst apparatuses having catalyst coating layers.

FIG. 1 shows simulation results of exhaust gas flow of a wall-flow substrate which does not have a catalyst coating layer. With reference to FIG. 1, though the flow rate of exhaust gas passing through the porous wall shows a small value that is approximately constant from the upstream end of the substrate to a point exceeding 50 mm, the flow rate of exhaust gas that rapidly increases from a point exceeding about 60 mm to the downstream end and passes through the porous wall at the downstream end (point 122 mm from the upstream end) reaches about eight times that near the upstream end.

In other words, it is considered that a large portion of the exhaust gas flowing into the wall-flow substrate travels inside the inlet side cells (on the porous wall) from the upstream end to the vicinity of the center of the substrate, and from the center of the substrate to the downstream end, passes through the porous wall and reaches the outlet side cell.

Thus, in the exhaust gas purification catalyst apparatus using a wall-flow substrate, in order to achieve efficient contact between the exhaust gas and the catalyst noble metal, it is considered advantageous to localize and arrange the catalyst noble metal in the inlet side cells near the surface on the upstream side, and to distribute and arrange the catalyst noble metal in the outlet side cells in a wide range from the surface of the downstream side to a deep location. According to this configuration, when the exhaust gas flowing into the wall-flow substrate travels in the inlet side cells from the upstream end to the vicinity of the center of the substrate, the exhaust gas can contact the catalyst noble metal localized near the surface of the inlet side cells, and when the exhaust gas passes through the porous wall from the center of the substrate to the downstream end, the exhaust gas can contact the catalyst noble metal which is widely distributed from the surface of the outlet side cell to a deep location.

However, when the arrangement of the catalyst noble metal on the porous wall of the substrate is carried out by forming a catalyst coating layer containing carrier particles and auxiliary catalyst particles, the exhaust gas passing through the porous wall can become blocked by the catalyst coating layer, whereby the exhaust gas flow can change from the intended aspect.

FIGS. 2 to 4 show simulation results of exhaust gas flow in the case in which a catalyst coating layer is formed in the interiors of the porous walls of the inlet side cells and the outlet side cells of a wall-flow substrate. The description "forming a catalyst coating layer in the interiors of the porous walls" means that catalyst coating layers are formed over predetermined ranges from the surfaces of the porous walls toward the depth direction. These catalyst coating layers contain inorganic oxide carrier particles, and the inorganic oxide carrier particles permeate into the pores of the porous walls to form the catalyst coating layers in the interiors of the porous membranes.

The catalyst coating layers of FIG. 2 are formed 85.4 mm (70% of the total length of the substrate) from the upstream end of the inlet side cells and 85.4 mm (70% of the total length of the substrate) from the downstream end of the outlet side cells, and the catalyst coating layer of the inlet side cells and the catalyst coating layer of the outlet side cells overlap in a range of 48.8 mm (40% of the total length of the substrate) of a central part. Note that the overlap portion is provided to prevent "blowing through" in which the exhaust gas passes through the exhaust gas purification catalyst apparatus without passing through the catalyst coating layer of the outlet side cells (the same applies below).

The catalyst coating layers of FIG. 3 are formed 48.8 mm (40% of the total length of the substrate) from the upstream end of the inlet side cells and 97.6 mm (80% of the total length of the substrate) from the downstream end of the outlet side cells, and the catalyst coating layer of the inlet side cells and the catalyst coating layer of the outlet side cells overlap in a range of 24.4 mm (20% of the total length of the substrate) near a central part upstream end.

The catalyst coating layers of FIG. 4 are formed 97.6 mm (80% of the total length of the substrate) from the upstream end of the inlet side cells and 48.8 mm (40% of the total length of the substrate) from the downstream end of the outlet side cells, and the catalyst coating layer of the inlet side cells and the catalyst coating layer of the outlet side cells overlap in a range of 24.4 mm (20% of the total length of the substrate) near a central part downstream end.

The coating amounts of the catalyst coating layer of the inlet side cells and the catalyst coating layer of the outlet side cells are as described below, and coating is carried out so that the total coating amount of the entirety of the substrate is 100 g.

FIG. 2: catalyst coating layer of the inlet side cells: 50 g, catalyst coating layer of the outlet side cells: 50 g FIG. 3: catalyst coating layer of the inlet side cells: 33 g, catalyst coating layer of the outlet side cells: 67 g FIG. 4: catalyst coating layer of the inlet side cells: 67 g, catalyst coating layer of the outlet side cells: 33 g Referring to FIGS. 2 to 4, when coating layers are formed on a wall-flow substrate, the tendency that the amount of exhaust gas passing through the porous wall is larger on the downstream side than on the upstream side of the substrate is maintained, but the difference is small. In the overlap portion between the catalyst coating layer of the inlet side cells and the catalyst coating layer of the outlet side cells, the amount of exhaust gas passing through the porous wall is lower than that of a single-layer portion.

From the results of FIGS. 2 to 4, it is understood that if the catalyst noble metal is arranged on the substrate by forming catalyst coating layers, the object of the present invention cannot be achieved. Though FIGS. 2 to 4 relate to exhaust gas purification catalyst apparatuses in which catalyst coating layers are formed inside a porous wall of a wall-flow substrate, similar results can be obtained for exhaust gas purification catalyst apparatuses in which catalyst coating layers are formed on the porous wall of the wall-flow substrate.

In the exhaust gas purification catalyst apparatus of the present invention, a wall-flow substrate comprising ceria-zirconia composite oxide particles as a constituent material is used. As a result, the catalyst noble metal can be directly supported in the porous wall of the substrate. Thus, in the exhaust gas purification catalyst apparatus of the present invention, catalyst coating layers need not be formed for arrangement of the catalyst noble metal. In the exhaust gas purification catalyst apparatus of the present invention, due to such a configuration, the catalyst noble metal can be arranged in an appropriate position without the need to form a catalyst coating layer.

As described above, the exhaust gas purification catalyst apparatus of the present invention may not include a catalyst coating layer on the porous partition wall. In the exhaust gas purification catalyst apparatus of this aspect, it is considered that the exhaust gas flow is substantially identical to the case of FIG. 1 with only a substrate.

Each element constituting the exhaust gas purification catalyst apparatus of the present invention will be described in order below.

<Honeycomb Substrate>

The substrate of the exhaust gas purification catalyst apparatus of the present invention is a honeycomb substrate having a plurality of cells partitioned by a porous partition wall.

The porous partition wall of the honeycomb substrate comprises ceria-zirconia composite oxide particles as a constituent material. The ceria-zirconia composite oxide particles may be particles of a solid solution of ceria and zirconia, and in addition to ceria and zirconia, a rare earth element oxide other than ceria may be further dissolved therein. The rare earth element oxide other than ceria may be, for example, yttrium oxide or lanthanum oxide.

In addition to the ceria-zirconia composite oxide particles, the porous partition wall may further comprise other inorganic oxide particles and an inorganic binder. The other inorganic oxide particles may be, for example, silica particles, alumina particles, zirconia particles, or composite oxide particles thereof. The inorganic binder may be, for example, alumina or titania.

In the honeycomb substrate of the exhaust gas purification catalyst apparatus of the present invention, the plurality of cells partitioned by the porous partition wall comprise:

an inlet side cell which is opened on an upstream side of an exhaust gas flow and sealed on a downstream side thereof, and an outlet side cell which is sealed on the upstream side of the exhaust gas flow and opened on the downstream side thereof, and are thereby configured to allow an exhaust gas flowed into the inlet side cell to pass through the porous partition wall and discharge from the outlet side cell.

<Catalyst Noble Metal>

The exhaust gas purification catalyst apparatus of the present invention comprises one or more catalyst noble metals supported by the honeycomb substrate. The catalyst noble metal may be one or more of platinum, palladium, and rhodium.

The catalyst noble metals are supported in an inlet side support region and an outlet side support region of the porous partition wall. When the exhaust gas purification catalyst apparatus of the present invention comprises two or more catalyst noble metals, one catalyst noble metal may be supported in the predetermined inlet side support region and the outlet side support region, or two or more may be supported in the predetermined inlet side support region and the outlet side support region. The catalyst noble metal supported in the inlet side support region may be the same as or may be different from the catalyst noble metal supported in the outlet side support region.

(Inlet Side Support Region)

The inlet side support region is present across a length of 60% or more and 100% or less of the total length of the honeycomb substrate from the exhaust gas flow upstream end of the inlet side cells. As can be understood from the simulation results shown in FIG. 1 described above, a large portion of the exhaust gas flowing into the wall-flow substrate travels inside the inlet side cells (on the porous wall) from the upstream end of the substrate to at least the vicinity of the center of the substrate. Therefore, by providing the inlet side support region with a certain length, the exhaust gas traveling on the porous wall of the inlet side cell can efficiently contact the catalyst noble metal contained in the inlet side support region.

From this viewpoint, the length of the inlet side support region may be, for example, 65% or more, 70% or more, 75% or more, or 80% or more of the total length of the honeycomb substrate.

The length of the inlet side support region may be 100% of the total length of the honeycomb substrate. However, in the downstream side of the substrate, a large portion of the exhaust gas passes through the porous wall and flows in a direction leading to the outlet side cells. In this portion, there is the outlet side support region, which is described later. Thus, even if the length of the inlet side support region is not 100% of the total length of the honeycomb substrate, contact between the exhaust gas and the catalyst noble metal is not impaired. From this viewpoint, the length of the inlet side support region may be 98% or less, 95% or less, 93% or less, 90% or less, 88% or less, 85% or less, 83% or less, or 80% or less of the total length of the honeycomb substrate.

The length of the inlet side support region may be, for example, 70% or more and 100% or less of the total length of the honeycomb substrate.

In the inlet side support region, when an amount of the catalyst noble metal supported in the inlet side support region is accumulated in the depth direction from the inlet side surface of the porous partition wall, the depth up to which 70% of the catalyst noble metal supported in the inlet side support region is supported ("depth of support of 70% of the catalyst noble metal") is 50% or less of the thickness of the porous partition wall. This requirement ensures that the catalyst noble metal is localized near the surface of the inlet side cell in the inlet side support region. The depth of supporting 70% of the catalyst noble metal in the inlet side support region may be 45% or less, 40% or less, 35% or less, 30% or less, 25% or less, or 20% or less of the thickness of the porous partition wall.

The depth of supporting 70% of the catalyst noble metal in the inlet side support region may be 1% or more, 5% or more, or 10% or more of the thickness of the porous partition wall.

(Outlet Side Support Region)

The outlet side support region is present in a length of 5% or more and 50% or less of the total length of the honeycomb substrate from the exhaust gas flow downstream end of the outlet side cells. As can be understood from the simulation results shown in FIG. 1 described above, a large portion of the exhaust gas flowing into the wall-flow substrate travels through the porous wall in a direction from the inlet side cell to the outlet side cell in the vicinity of the downstream end of the substrate. Thus, due to the presence of the outlet side support region in the range described above, the exhaust gas which passes through the porous wall in the vicinity of the downstream end of the substrate and reaches the outlet side cell can efficiently contact the catalyst noble metal contained in the outlet side support region.

From this viewpoint, the length of the outlet side support region may be, for example, 10% or more, 15% or more, 20% or more, 25% or more, or 30% or more of the total length of the honeycomb substrate.

As described above, in the upstream side of the substrate, a large portion of the exhaust gas travels in the interior (or in the porous wall) of the inlet side cells. As a result, even if the outlet side support region is provided in this portion, it is considered that the contact efficiency between the catalyst noble metal supported in this portion and the exhaust gas is not high. Thus, from the viewpoint of effective utilization of catalyst noble metal, the length of the outlet side support region may be 48% or less, 45% or less, 43% or less, or 40% or less of the total length of the honeycomb substrate.

The length of the outlet side support region may be, for example, 10% or more and 45% or less of the total length of the honeycomb substrate.

In the outlet side support region, when an amount of the catalyst noble metal supported in the outlet side support region is accumulated in the depth direction from an outlet side surface of the porous partition wall, the depth up to which 70% of the catalyst noble metal supported in the outlet side support region ("depth of supporting 70% of the catalyst noble metal") is supported is 50% or more of the thickness of the porous partition wall. This requirement ensures that the catalyst noble metal is distributed over a wide range from the surface of the outlet side cell to the depth direction of the porous wall in the outlet side support region. The depth of supporting 70% of the catalyst noble metal in the outlet side support region may be 55% or more, 60% or more, 65% or more, or 70% or more of the thickness of the porous partition wall.

The depth of supporting 70% of the catalyst noble metal in the outlet side support region may be, for example, 90% or less, 80% or less, 75% or less, 70% or less, 65% or less, or 60% or more of the total thickness of the porous partition wall.

(Analysis of Depth of Supporting 70% of Catalyst Noble Metal)

The depths of supporting 70% of the catalyst noble metal in the inlet side support region and the outlet side support region may be analyzed by known means. For example, by combining an appropriate surface grinding method such as ion etching with, for example, an appropriate surface analysis method such as X-ray photoelectron spectroscopy (XPS) or Auger electron spectroscopy (AES), the distributions of the catalyst noble metal in the depth direction in each support area can be known.

Regarding the inlet side support region, the outlet side support region, and the overlap portion (which is described later), by separating the above analysis results into the results of an inlet side support region and an outlet side support region using an appropriate waveform separation method, the distribution of the catalyst noble metal in the depth direction in each support region can be known.

(Overlap Portion)

As long as the inlet side support region and the outlet side support region are each present as the aspect described above, and the total length of the inlet side support region and the outlet side support region is arbitrary.

However, when exhaust gas passes through the exhaust gas purification catalyst apparatus, in order to prevent "blowing through" where the exhaust gas passes through without passing through the outlet side support region, it is preferable that the total length of the inlet side support region and the outlet side support region be set longer than the total length of the honeycomb substrate, and an overlapping portion of both support regions be provided. From this viewpoint, the total length of the inlet side support region and the outlet side support region may exceed 100% of the total length of the substrate, or may be 105% or more, 110% or more, 115% or more, 120% or more, 125% or more or 130% or more of the total length of the substrate.

The upper limit of the overlap portion is not particularly limited. In the present invention, since the length of the inlet side support region is 100% or less of the total length of the substrate and the length of the outlet side support region is 50% or less of the total length of the substrate, the total length of the inlet side support region and the outlet side support region is theoretically 150% or less of the total length of the substrate. The total length of the inlet side support region and the outlet side support region may be 150% or less of the total length of the substrate, or may be 145% or less, 140% or less, 135% or less, 130% or less, 125% or less, or 120% or less of the total length of the substrate.

<Specific Example of Exhaust Gas Purification Catalyst Apparatus>

Figure 5:
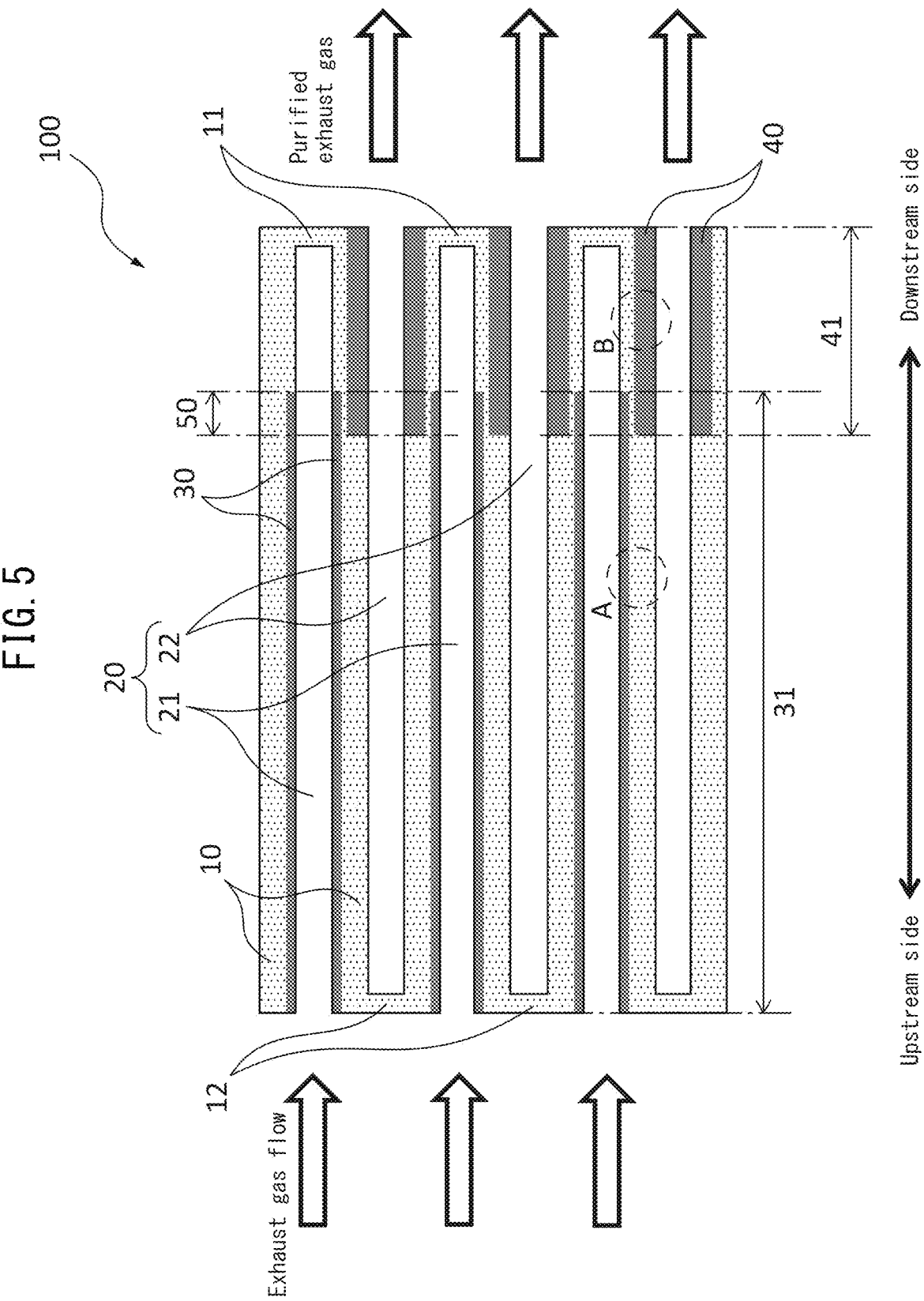
FIG. 5 is a schematic cross-sectional view detailing an example of the structure of the exhaust gas purification catalyst apparatus of the present invention.
Figure 6:
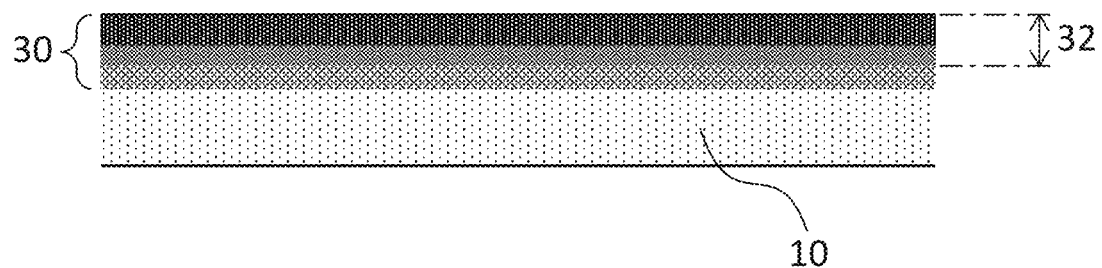
FIG. 6 is an enlarged view of portion A of FIG. 5.
Figure 7:
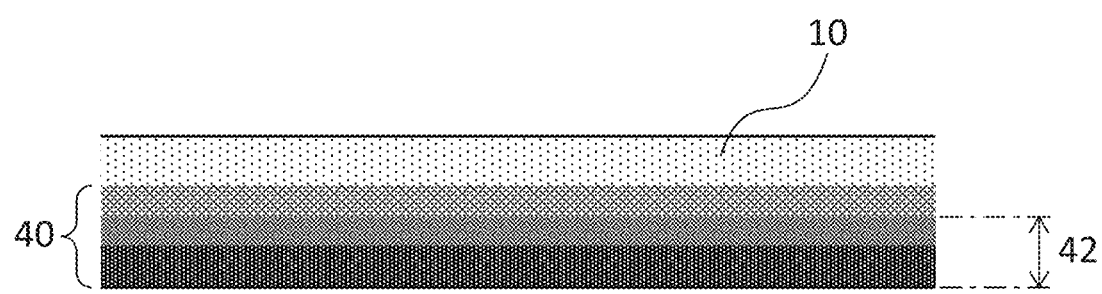
FIG. 7 is an enlarged view of portion B of FIG. 5.

FIGS. 5 to 7 show an example of the structure of the exhaust gas purification catalyst apparatus of the present invention. FIG. 5 is a schematic cross-sectional view of the example of the exhaust gas purification catalyst apparatus of the present invention, FIG. 6 is an enlarged view of portion A of FIG. 5, and FIG. 7 is an enlarged view of portion B of FIG. 5.

The exhaust gas purification catalyst apparatus (100) of FIG. 5 comprises a honeycomb substrate and one or more catalyst noble metals supported by the honeycomb substrate.

The honeycomb substrate comprises a plurality of cells (20) partitioned by a porous partition wall (10). The porous partition wall (10) comprises ceria-zirconia composite oxide particles as a constituent material thereof.

The plurality of cells (20) of the honeycomb substrate comprise:

inlet side cells (21) which are open on an upstream side of an exhaust gas flow and sealed on a downstream side thereof by a downstream side seal part (11), and outlet side cells (22) which are sealed on the upstream side of the exhaust gas flow by an upstream side seal part (12) and open on the downstream side thereof, and are thereby configured to allow an exhaust gas flowed into the inlet side cells (21) to pass through the porous partition wall (10) and discharge from the outlet side cells (22).

The catalyst noble metal is supported in inlet side support regions (30) and outlet side support regions (40) of the porous partition wall (10).

The inlet side support regions (30):

are present in a length (31) of 60% or more and 100% or less of a total length of the honeycomb substrate from an exhaust gas flow upstream end of the inlet side cells (21), and when an amount of the catalyst noble metal supported in the inlet side support regions (30) is accumulated in the depth direction from an inlet side surface of the porous partition wall (10), the depth (32) up to which 70% of the catalyst noble metal supported in the inlet side support regions (30) is supported is 50% or less of the thickness of the porous partition wall (10) (refer to FIGS. 5 and 6).

The outlet side support regions (40):

are present in a length (41) of 5% or more and 50% or less of the total length of the honeycomb substrate from an exhaust gas flow downstream end of the outlet side cells (22), and when an amount of the catalyst noble metal supported in the outlet side support regions (40) is accumulated in the depth direction from an outlet side surface of the porous partition wall (10), the depth (42) up to which 70% of the catalyst noble metal supported in the outlet side support regions (40) is supported is 50% or more of the thickness of the porous partition wall (10) (refer to FIGS. 5 and 7).

In the exhaust gas purification catalyst apparatus (100), the total of the length (31) of the inlet side support region (30) and the length (41) of the outlet side support region (40) is longer than the total length of the substrate, and thus, an overlap portion (50) between the inlet side support region (30) and the outlet side support region (40) is present.

<<Exhaust Gas Purification Catalyst Apparatus Production Method>>

The exhaust gas purification catalyst apparatus of the present invention may be produced by an appropriate method. For example, it may be produced by forming the inlet side support region and the outlet side support region on the honeycomb substrate in any order.

As the honeycomb substrate, an appropriate wall-flow honeycomb substrate may be selected and used in accordance with the desired honeycomb substrate which should be included in the exhaust gas purification catalyst apparatus.

The inlet side support regions of the exhaust gas purification catalyst apparatus of the present invention may be formed by a method comprising, for example:

arranging a support region formation coating liquid in the inlet side cells of the honeycomb substrate;

applying the support area formation coating liquid described above to the inlet side cells side of the porous partition wall of the honeycomb substrate by at least one of pumping from the openings of the inlet side cells and suctioning from the openings of the outlet side cells; and firing the honeycomb substrate after application.

The outlet side support regions of the exhaust gas purification catalyst apparatus of the present invention may be formed by a method comprising, for example:

arranging a support region formation coating liquid in the outlet side cells of the honeycomb substrate;

applying the support area formation coating liquid described above to the outlet side cells side of the porous partition wall of the honeycomb substrate by at least one of pumping from the openings of the outlet side cells and suctioning from the openings of the inlet side cells; and firing the honeycomb substrate after application.

The support region formation coating liquid comprises at least a catalyst noble metal precursor and a solvent, and may comprise optional components such as a thickener. The support region formation coating liquid used in the present invention need not comprise inorganic oxide particles.

The precursor of the catalyst noble metal may be a strong acid salt of the catalyst noble metal, and in particular, may be a nitrate or sulfate of the catalyst noble metal.

The solvent may be, for example, water, a water-soluble organic solvent, or a mixture thereof, and is typically water.

As the thickener, for example, a water-soluble polymer, a cellulose derivative, or a polysaccharide may be appropriately selected and used.

The firing may be carried out under appropriate conditions, and examples thereof include conditions of 400° C. or higher and 1,000° C. or lower, and 30 minutes or longer to 12 hours or shorter.

By appropriately adjusting the composition of the support region formation coating liquid and the application conditions, inlet side support regions and outlet side support regions having appropriate lengths and depths of supporting 70% of the catalyst noble metal can be formed. For example, if the viscosity of the coating liquid is increased, the depth of supporting 70% of the catalyst noble metal tends to be shallow, and if the viscosity of the coating liquid is decreased, the depth of supporting 70% of the catalyst noble metal tends to be deep. If the amount of coating liquid arranged in the openings of the inlet side cells or outlet side cells is increased, the lengths of the support areas tend to become longer, and if the amount of coating liquid is reduced, the lengths of the support areas tend to become shorter.

DESCRIPTION OF REFERENCE SIGNS

10 porous partition wall
11 downstream side seal part
12 upstream side seal part
20 cell
21 inlet side cell
22 outlet side cell
30 inlet side support region
31 length of inlet side support region
32 depth of supporting 70% of catalyst noble metal in inlet side support region
40 outlet side support region
41 length of outlet side support region
42 depth of supporting 70% of catalyst noble metal in outlet side support region
50 overlap portion
100 exhaust gas purification catalyst apparatus

The invention claimed is:

1. An exhaust gas purification catalyst apparatus comprising a honeycomb substrate and one or more catalyst noble metals supported by the honeycomb substrate, wherein the honeycomb substrate has a plurality of cells partitioned by a porous partition wall, the porous partition wall contains ceria-zirconia composite oxide particles as a constituent material, the plurality of cells comprise:
- an inlet side cell which is open on an upstream side of an exhaust gas flow and sealed on a downstream side thereof, and
- an outlet side cell which is sealed on the upstream side of the exhaust gas flow and open on the downstream side thereof, and are thereby configured to allow an exhaust gas flowed into the inlet side cell to pass through the porous partition wall and discharge from the outlet side cell, the catalyst noble metal is supported in an inlet side support region and an outlet side support region of the porous partition wall, the inlet side support region:
- is present in a length of more than 80% and 100% or less of a total length of the honeycomb substrate from an exhaust gas flow upstream end of the inlet side cell, and
- when an amount of the catalyst noble metal supported in the inlet side support region is accumulated in a depth direction from an inlet side surface of the porous partition wall, a depth up to which 70% of the catalyst noble metal supported in the inlet side support region is supported is less than 20% of the thickness of the porous partition wall, and the outlet side support region:
- is present in a length of 5% or more and 50% or less of the total length of the honeycomb substrate from an exhaust gas flow downstream end of the outlet side cell, and
- when an amount of the catalyst noble metal supported in the outlet side support region is accumulated in the depth direction from an outlet side surface of the porous partition wall, a depth up to which 70% of the catalyst noble metal supported in the outlet side support region is supported is more than 50% of the thickness of the porous partition wall.

2. The exhaust gas purification catalyst apparatus according to claim 1, wherein the length of the outlet side support region is 10% or more and 45% or less of the total length of the honeycomb substrate.

3. The exhaust gas purification catalyst apparatus according to claim 1, wherein when the amount of the catalyst noble metal supported in the outlet side support region is accumulated in the depth direction from the outlet side surface of the porous partition wall, the depth up to which 70% of the catalyst noble metal supported in the outlet side support region is supported is 60% or more of the thickness of the porous partition wall.

4. The exhaust gas purification catalyst apparatus according to claim 1, wherein the catalyst noble metal is one or more selected from platinum, palladium, and rhodium.

5. The exhaust gas purification catalyst apparatus according to claim 1, wherein the porous partition wall does not have a catalyst coating layer.

6. The exhaust gas purification catalyst apparatus according to claim 2, wherein when the amount of the catalyst noble metal supported in the outlet side support region is accumulated in the depth direction from the outlet side surface of the porous partition wall, the depth up to which 70% of the catalyst noble metal supported in the outlet side support region is supported is 60% or more of the thickness of the porous partition wall.

7. The exhaust gas purification catalyst apparatus according to claim 2, wherein the porous partition wall does not have a catalyst coating layer.

8. The exhaust gas purification catalyst apparatus according to claim 2, wherein when the amount of the catalyst noble metal supported in the outlet side support region is accumulated in the depth direction from the outlet side surface of the porous partition wall, the depth up to which 70% of the catalyst noble metal supported in the outlet side support region is supported is 60% or more of the thickness of the porous partition wall, and
the porous partition wall does not have a catalyst coating layer.

* * * * *